Figure 1:
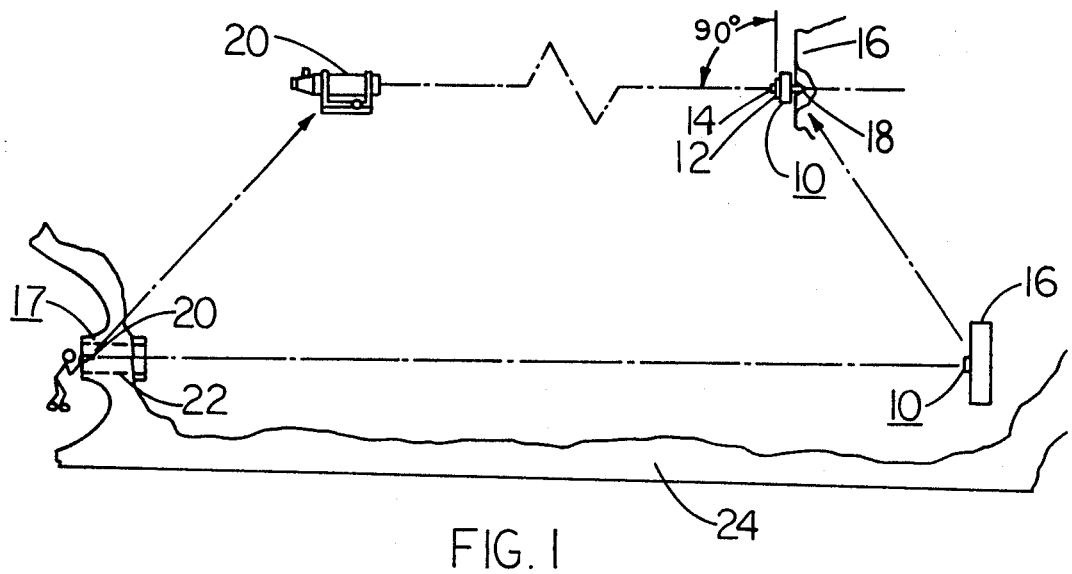

United States Patent [19]

Murphy

[11] 3,736,062
[45] May 29, 1973

[54] CO-AXIAL COORDINATOR AND METHOD OF USE IN ALIGNING ROTATING UNITS IN PROPULSION SYSTEMS

[76] Inventor: Judson D. Murphy, Rte. 4, Box 4, Natchas Dr., Slidell, La. 70458

[22] Filed: Mar. 10, 1972

[21] Appl. No.: 233,410

[52] U.S. Cl..................356/153, 29/464, 115/.5 R, 356/172
[51] Int. Cl......................G01b 11/26, B23q 3/00
[58] Field of Search..................356/138, 153, 172; 350/310, 288; 33/286; 115/.5; 29/407, 464

[56] References Cited

UNITED STATES PATENTS 3,580,211   5/1971   Kurashiki et al.....................115/.5 R
3,601,476   8/1971   MacKenzie..........................350/310

Primary Examiner—Ronald L. Wibert
Assistant Examiner—V. P. McGraw
Attorney—James B. Lake, Jr.

[57] ABSTRACT

An optical alignment instrument comprises an annular mirror, with an optically flat face, supported in a mirror mount and mounted in an annular base. The mirror and mount are concentrically supported in the base by interfitting spherical surfaces, and radially supported by movable wedging cams mounted therebetween and spaced apart ninety degrees for tilting the mirror independently of said base. A straight target pin, having oppositely disposed ends, is adapted to extend through an annular space defined by the mirror, mount and base, with the oppositely disposed ends respectively projecting from the base and the mirror. The end projecting from the base is adapted to engage in a center recess tapered in the coupling end of every rotating unit in a propulsion system, and to snugly engage said base and loosely engage mirror and mount. Magnetic plates are fixed to the base for removably mounting it, with the snugly engaged target pin, on a coupling end and concentric with the center recess thereof. The optical alignment instrument is used in combination with an alignment telescope, having an illuminated reticle, for aligning the various rotating units of a propulsion system by a new method.

5 Claims, 3 Drawing Figures

PATENTED MAY 29 1973 3,736,062

SHEET 1 OF 2

CO-AXIAL COORDINATOR AND METHOD OF USE IN ALIGNING ROTATING UNITS IN PROPULSION SYSTEMS

The invention relates generally to optical alignment instruments, and more particularly to a reflecting instrument having mechanical and optical axes for establishing a co-axial center line between rotating units of a propulsion system, and a method of using said instruments.

An alignment telescope with a lighted reticle is used in cooperation with the invention. It is old in the art to use an optically flat mirror with a telescope to establish an optical co-axial center line therebetween. However the old mirror and method required extensive "bucking in," that is aligning a telescope and mirror, in trial and error procedures and also lumped errors of different origins. Thus errors in a coaxial center line might be caused by a lack of squareness between the center line of the propulsion unit and its coupling end, or a misalignment of the propulsion unit with respect to the co-axial center line of the other rotating units.

It is an object of the invention to provide a reflecting instrument that can independently index a mirror to a coupling end and a target pin to the center recess of said coupling end.

Another object of the invention is to provide a new method of "bucking in" by auto collimation to set the telescope and optical alignment instrument, hereinafter called the co-axial coordinator, on parallel lines of sight and reflection, and by short focus reflection to bring the parallel lines into coaxial center line alignment.

Figure 2:
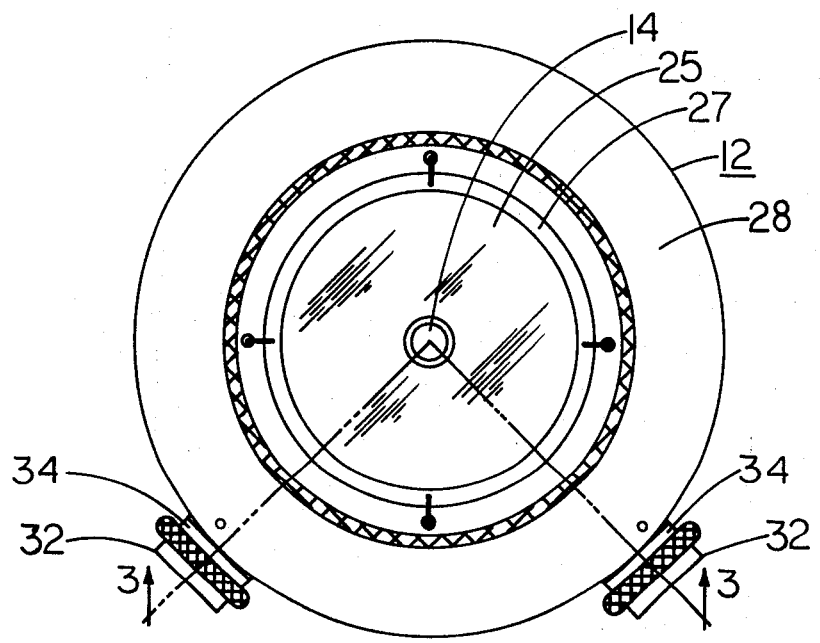
Figure 3:
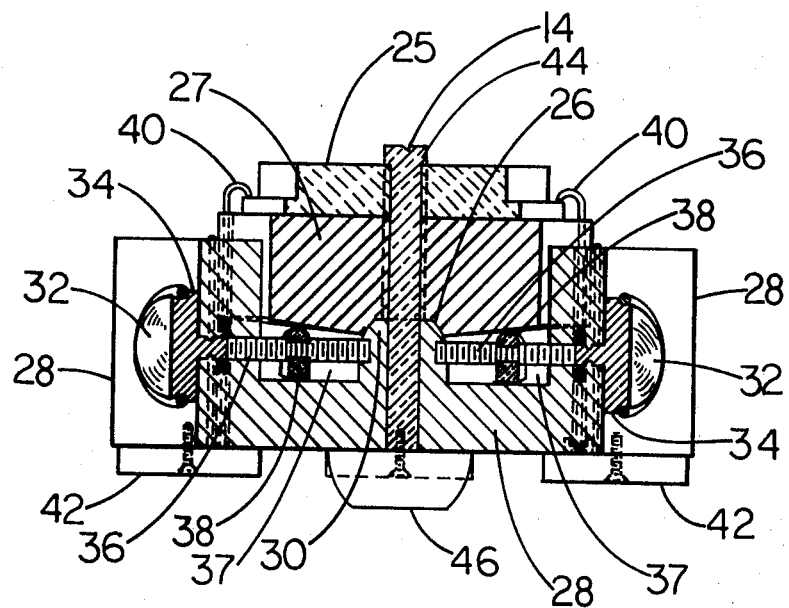

Other objects and a fuller understanding of the invention may be had by referring to the following description and claims taken together with the following drawings, in which:

FIG. 1 is a sketch in elevation showing the optical set-up with the invention for establishing the co-axial center line of a ship's propulsion system, and an enlarged optics offset, FIG. 2 is a plan view of the invention, and FIG. 3 is a sectional view along section lines 3—3 of FIG. 2.

Referring to FIG. 1, the invention 10, hereinafter referred to as a co-axial coordinator, comprises in combination an annular reflecting instrument 12 and a straight target pin 14. The annular reflecting instrument 12 can be indexed parallel to a coupling end 16 of a propulsion system 17, and the pin 14 extending through the annular reflecting instrument can be indexed to a center recess 18 tapered in the center of the coupling end 16. An alignment telescope 20 with an illuminatable reticle is necessary in the use of the co-axial coordinator and is mounted at the other end of said propulsion system from the coupling end 16. The telescope and the annular reflecting instrument 12 are "bucked in" on parallel lines of sight by autocollimation. In this process the telescope is positioned in the example illustrated in FIG. 1 in a stern tube 22 of a partially outlined ship 24, and focused on infinity with annular reflecting instrument in its line of sight. The annular reflecting instrument is adjusted by means hereinafter described to reflect this line of sight in parallel lines back to the telescope. By short focus reflection in which the telescope is focused on the end of target pin 14 and by means hereinafter described is adjusted to bring the line of sight and reflected line of sight into alignment and thereby establish the co-axial center line of the system which is provable by rotating the coupling end 16 and the telescope 20.

Referring to FIGS. 2 and 3, the annular reflecting instrument 12 comprises an annular mirror 25 fixed on an annular mount 27 which defines a partially spherical recess 26 on the back thereof concentric with the annular space defined therethrough. The annular mirror and mount are supported in an annular base 28 on a center projection 30 also concentric with the annular space defined therethrough and partially spherical in shape complementary to recess 26 in which it engages. Micrometers 32, spaced ninety degrees apart, are mounted in the annular reflecting instrument 12. Each micrometer comprises a graduated drum 34 to which is fixed a threaded shaft 36 that extends radially to said center projection 30, and intermediate said mount 27 and base 28 in an annular space 37 defined therebetween. A wedging cam 38, tapped complementary to threaded shaft 36 is mounted on each shaft 36 and between each said drum and center projection 30. Turning the drums 34 causes the wedging cams to tilt the mirror 25 and mount 27 on the engaged sperical surfaces of center projection 30 and center recess 26. Spring clips 40 flexibly hold the mirror and mount in the base 28 to allow for the tilt, and the concentric and congruent annular spaces defined by the mirror and mount are larger in diameter than that of the target pin 14 passing therethrough to allow said tilting without binding. Magnets 42 are fixed to the back of the base 28 for magnetically fastening the refelcting instrument to a coupling end and parallel thereto.

Referring to FIG. 3, the straight target pin 14 comprises a smooth shaft 44 having a diameter to snugly engage in an annular space defined in base 28 and loosely engage in annular spaces defined by mirror 25 and mount 27. A foot 46 is fixed to an end of the shaft 44 square with its longitudinal axis. The foot comprises a truncated sphere, the surface of which is complementary to the center recess tapered into a rotative coupling end. The foot is adapted to fit snugly in the tapered recess without bottoming out. The other end of shaft 44 is suitably engraved for targeting purposes.

In use the co-axial coordinator 10 is attached by its magnets to coupling end 16 with foot 46 of target pin 14 engaged in center recess 18 of said coupling end. The micrometers 32 are set at zero reading in which the vertical planes of annular mirror 25 and mount 27 are parallel to the vertical plane of base 28 and magnets 42 fixed thereon. The telescope 20 is mounted in or adjacent to a stern tube 22 of a ship's propulsion system and focused on infinity. The telescope and mount are positioned, in cooporation with adjustments of micrometers 32 of the co-axial coordinator, to pick-up in its field of vision the reflected image of the telescope's illuminated reticle. Since focusing at infinity places all lines of sight parallel in the feild of vision, reflected lines of sightare also parallel but not necessarily in congruent alignment. The alignment telescope 20, in addition to an illuminatable reticle or cross hairs, may also be provided with an optical micrometer, well known in the art and not illustrated, for parallely adjusting lines of sight with respect to the lighted reticle. The focus of the telescope is now changed from infinity to the end of target pin 14 projecting beyond annular mirror 25, and the reflected image of the illuminated reticle and the target pin end as viewed through the telescope are superimposed on the illuminated reticle by adjusting said optical micrometer of the telescope. A co-axial center line has now been established. It can be proved by rotating the coupling end 16 one hundred eighty degrees and the telescope in its cradle similarly. Any deviation noted in the position of the reflected image should be halved and corrected in the first instance with micrometers 32 and in the second instance with the optical micrometers of the telescope, and the readings applied as the margin of error due to lack of squareness between coupling end 16 and the longitudinal axis of the unit to which said coupling end is fixed, and the misalignment of said unit itself.

What is claimed is:

1. A co-axial coordinator for use in aligning rotative units and supports of a propulsion system comprising: annular reflecting means with an optical flat face for indexing with a coupling end of a rotative unit and square with a center line thereof; target pin means loosely fitting in and extending through said annular reflecting means for indexing with a center recess tapered into said coupling end and concealed by said annular reflecting means when mounted concentric therewith; base means adjustably mounted on said coupling end for tiltably mounting said annular reflecting means and rigidly mounting said target pin means thereby and thereon; and micrometer adjusting means mounted intermediate a part of said base means and annular reflecting means for adjustably titling said annular reflecting means with respect to said target pin and base means, and said coupling end.

2. A co-axial coordinator as described in claim 1 wherein said annular reflecting means comprises: an annular mirror having a stepped perimeter; an annular mirror mount fixed concentrically to the rear of said mirror, said mount defining on a conically shaped back a center spherical recess for flexibly engaging in said base means.

3. A co-axial coordinator as described in claim 1 wherein said base means comprises: an annular cup-shaped base having a center projection with shperical surfaces for tiltably engaging with the back of said annular reflecting means concentrically, annular spaces defined by said annular reflecting means and annular base means being congruent, and the annular space of said base means being adapted to snugly engage said target pin means and square therewith; and spring clips mounted in said base means and adapted to flexibly engage said annular reflecting means against displacement therefrom.

4. A co-axial coordinator as described in claim 1 wherein said micrometer adjusting means comprises: threaded shafts, spaced 90° apart radially, mounted in said base means sides and extending intermediate said annular reflecting means and said base means back; wedging cams, complementary tapped to engage on said shafts and adapted to engage opposed surfaces of said annular reflecting means and said base means; and graduated drums for rotating said shafts and moving said caming wedges in tilting relation with said annular reflecting means.

5. A new method of aligning rotative and support units of a propulsion system comprising the steps of: attaching an annular mirror concentrically on a coupling end of a propulsion system and parallel to said end; mounting an aligning telescope having a lighted reticle at a far end of said propulsion system from said coupling end and pointed at said annular mirror; "bucking in" said annular mirror and telescope by auto-collimation into parallel positions and lines of sight within the field of vision of said telescope; aligning said parallel positions and lines of sight and reflection by a combination of optical short focus reflection of the end of a target pin in extension of a center recess tapered in said coupling end and adjustment of said telescope to thereby establish a co-axial center line for the propulsion system; proving said co-axial center line by rotating said coupling end 180 degrees and said telescope in its cradle similarly; and correcting any change in position of reflected images of the lighted reticle and target pin end by lateral repositioning of said co-axial center line to halve said change of position with the annular mirror for reticle images change of position, and with the telescope for end of target pin change of position.

* * * * *